(12) United States Patent
Matsunaga

(10) Patent No.: US 9,849,375 B2
(45) Date of Patent: Dec. 26, 2017

(54) GAME PROGRAM AND GAME DEVICE

(71) Applicant: KABUSHIKI KAISHA SEGA Games, Tokyo (JP)

(72) Inventor: Jun Matsunaga, Tokyo (JP)

(73) Assignee: KABUSHIKI KAISHA SEGA Games, Tokyo (JP)

(*) Notice: Subject to any disclaimer, the term of this patent is extended or adjusted under 35 U.S.C. 154(b) by 286 days.

(21) Appl. No.: 14/272,225

(22) Filed: May 7, 2014

(65) Prior Publication Data

US 2014/0335951 A1    Nov. 13, 2014

(30) Foreign Application Priority Data

May 10, 2013    (JP) .................................. 2013-100726

(51) Int. Cl.
| A63F 13/00 | (2014.01) |
| A63F 13/2145 | (2014.01) |
| A63F 13/92 | (2014.01) |
| A63F 13/822 | (2014.01) |
| A63F 13/56 | (2014.01) |

(52) U.S. Cl.
CPC .......... *A63F 13/2145* (2014.09); *A63F 13/56* (2014.09); *A63F 13/822* (2014.09); *A63F 13/92* (2014.09)

(58) Field of Classification Search
CPC ...................................................... A63F 13/00
See application file for complete search history.

(56) References Cited

U.S. PATENT DOCUMENTS

2002/0160835 A1* 10/2002 Fujioka .................. A63F 13/10
                                                                    463/31
2014/0221094 A1*  8/2014 Fujioka ............... A63F 13/2145
                                                                    463/31

FOREIGN PATENT DOCUMENTS

JP           2006-95334 A       4/2006
JP          2012249770 A   *  12/2012

OTHER PUBLICATIONS

English Translation: JP 2012/249770, Computer Game Program, and Computer Game System, Dec. 20, 2012, pp. 40.*
Sega Corporation, "Game Flow", <http://emaki.sega.jp/jp/pc/play/>, downloaded Apr. 23, 2013 (with partial English translation).

* cited by examiner

*Primary Examiner* — Jay Liddle
*Assistant Examiner* — Alex F. R. P. Rada, II
(74) *Attorney, Agent, or Firm* — Drinker Biddle & Reath LLP

(57) ABSTRACT

A game program causes a computer to implement a player character movement control function of controlling a player character to move from its home position toward a target movement position which has been set and, when a predetermined condition is met after the player character has moved to the set target movement position, controlling the player character to move from the current position to a second area including the home position.

9 Claims, 10 Drawing Sheets

GAME PROGRAM AND GAME DEVICE

BACKGROUND

Disclosed herein are a game program and a game device.

Conventionally, so-called "tower defense games" are known, in which a player fixedly places player characters in prescribed positions within a game area and uses the player characters to intercept a group of enemy characters appearing and moving toward the player's area. The goal of the game is to protect the player's area from the enemies.

For example, Non-Patent Literature Document 1 below discloses a technique related to a tower defense game. This technique removes the above-described concept of fixedly placing the player characters, and enables the player characters, which have been placed in prescribed positions, to be moved to other positions in response to the player's operations.

CITATION LIST

Non-Patent Literature Document

[Non-Patent Literature Document 1] Author: Unknown, "Game Flow", [online], Date of Publication: Unknown, SEGA Corporation, [Searched on Apr. 23, 2013], Website URL: http://emaki.sega.jp/jp/pc/play/

SUMMARY

In a "tower defense game", it is important to hold player characters ready for interception. If the player characters can move as in Non-Patent Literature Document 1, frequent operations will be required to keep them ready for interception, leading to degradation of operability for the player.

Embodiments of the invention provide a game program and a game device which improve the operability for the player.

A game program according to the invention causes a computer to implement: an area setting function of setting a game area, the game area comprising at least a first area in which a target movement position of an enemy character can be set, a second area in which a home position of a player character can be set, and a third area in which a target movement position of the player character can be set; an enemy character movement control function of setting an initial position of the enemy character in an area other than the first and second areas in the game area, setting a target movement position of the enemy character in the first area, and controlling the enemy character to move from the initial position toward the target movement position that has been set; a player character movement control function of setting the home position in the second area, setting a target movement position of the player character in the third area in response to an operation input to the computer, and controlling the player character to move from the home position toward the target movement position that has been set; a battle control function of controlling the player character and the enemy character to fight against each other in accordance with a positional relationship between the player character and the enemy character; and a termination function of terminating a game in the case where a predetermined condition is met; wherein in the case where a predetermined condition is met after the player character has moved to the set target movement position, the player character movement control function controls the player character to move from the current position to the second area including the home position.

In the game program disclosed herein, it is preferable that the player character movement control function sets a current position of the enemy character as the target movement position of the player character.

In the game program disclosed herein, it is preferable that the second area includes a plurality of sub-areas in which the home position can be set, and that the area setting function sets a plurality of paths for the enemy character to move thereon in the third area, the number of the paths being set to correspond to the number of the sub-areas.

In the game program disclosed herein, it is preferable that the player character movement control function controls the player character to move across one path and another path among the plurality of paths.

In the game program disclosed herein, it is preferable that, for each of a plurality of player characters, the player character movement control function sets a home position in one of the sub-areas, sets a target movement position of the player character in the third area in response to an operation input to the computer, and controls the player character to move from the home position toward the set target movement position, and that the game program causes the computer to further implement an abilities changing function of changing abilities of at least one of the player characters in accordance with a formation based on the home positions of the player characters.

In the game program disclosed herein, it is preferable that, in the case of controlling the player character to move to the second area, the player character movement control function controls the player character to move to the home position where the player character was located, and that, in the case where the home positions of the player characters fail to match the formation, the abilities changing function returns the changed abilities of the player character(s) to the abilities before the change.

In the game program disclosed herein, it is preferable that the player character movement control function changes the home position of the player character within the second area, in response to an operation input to the computer.

In the game program disclosed herein, it is preferable that the abilities changing function changes the abilities of the player character(s) on the conditions that the home positions of the player characters match the formation and that the current positions of all the player characters correspond to the home positions thereof.

A game device according to the invention comprises: an operation unit which accepts an operation by a player; an area setting unit which sets a game area, the game area comprising at least a first area in which a target movement position of an enemy character can be set, a second area in which a home position of a player character can be set, and a third area in which a target movement position of the player character can be set; an enemy character movement control unit which sets an initial position of the enemy character in an area other than the first and second areas in the game area, sets a target movement position of the enemy character in the first area, and controls the enemy character to move from the initial position toward the target movement position that has been set; a player character movement control unit which sets the home position in the second area, sets a target movement position of the player character in the third area in response to an operation input to the operation unit, and controls the player character to move from the home position toward the target movement position that has been set; a battle control unit which controls the player character and the enemy character to fight against each other in accordance with a positional relationship between the player character and the enemy character; and a termination unit which terminates a game in the case where a predetermined condition is met; wherein in the case where a predetermined condition is met after the player character has moved to the set target movement position, the player character movement control unit controls the player character to move from the current position to the second area including the home position.

According to the invention, it is possible to improve the operability for the player.

DETAILED DESCRIPTION

Figure 1:
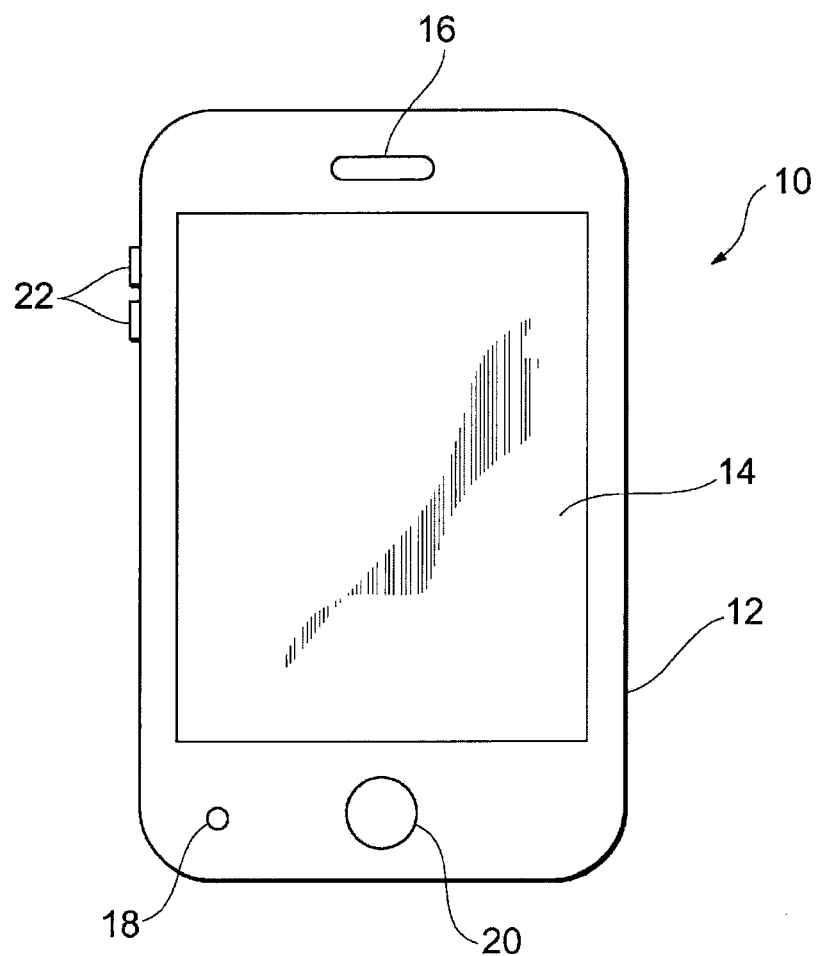
FIG. 1 is a mobile phone front view showing an exemplary external structure of a mobile phone according to an embodiment of the invention.

An embodiment of the invention will be described below with reference to the drawings. It should be noted that the embodiment described below is illustrative only and is not intended to exclude various modifications or applications of techniques not explicitly described below. The invention can be carried out in various manners (combining embodiments, for example), without deviating from the scope of the invention. In the following description with reference to the drawings, the same or similar parts are denoted by the same or similar reference numerals. The drawings are schematic; they do not necessarily reflect the actual dimensions or ratios. Different drawings may include corresponding portions which differ in dimensional relationship or ratio from each other.

A game device according to an embodiment of the invention may be a video game machine, a portable game machine, an arcade game machine, a personal computer, or any other computer game machine. The game device of the embodiment described below is a portable game machine, particularly a mobile phone, by way of example. A game program according to an embodiment of the invention is executed, for example, in this mobile phone.

External Structure

An external structure of the mobile phone 10 according to the embodiment will be described first. FIG. 1 is a mobile phone front view which illustrates an exemplary external structure of the mobile phone 10 of the embodiment.

As shown in FIG. 1, the mobile phone 10 comprises a rectangular thin casing 12 having one surface mostly occupied by a touch panel 14. On the same surface (front surface) on which the touch panel 14 is arranged, a speaker 16, a microphone 18, and a hard button 20 are provided. On the side and bottom surfaces of the mobile phone 10, hard keys 22 and an external interface such as an audio output terminal 24 (see FIG. 2) are provided. Further, on the back surface of the mobile phone 10, a camera 26 (see FIG. 2) is provided.

Hardware Configuration

Figure 2:
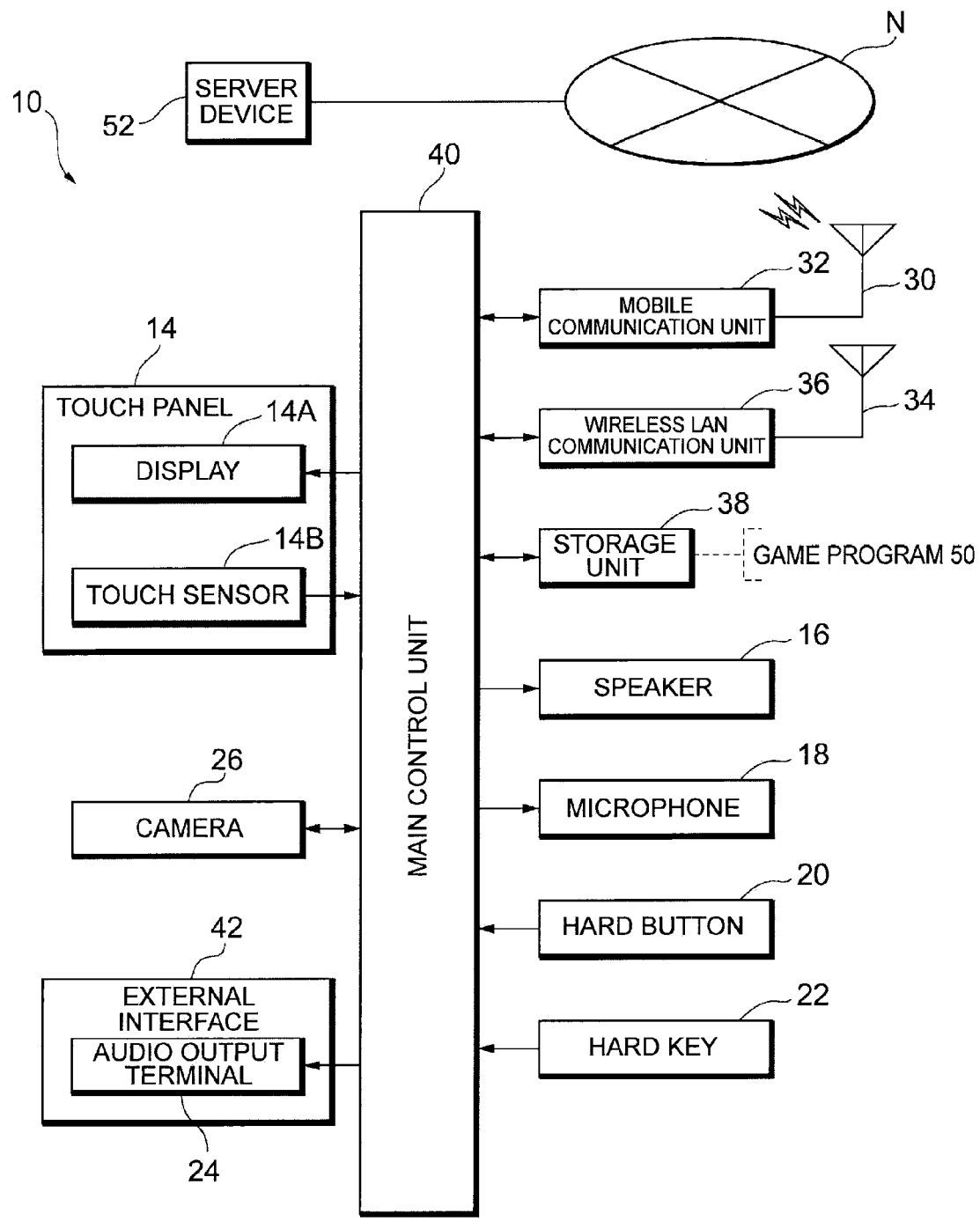
FIG. 2 is a block diagram schematically showing the hardware configuration of the mobile phone of the embodiment.

The hardware configuration of the mobile phone 10 according to the embodiment will now be described. FIG. 2 is a block diagram schematically showing the hardware configuration of the mobile phone 10 of the embodiment.

The mobile phone 10 comprises, besides the above-described components, at least a mobile communication antenna 30, a mobile communication unit 32, a wireless LAN communication antenna 34, a wireless LAN communication unit 36, a storage unit 38, and a main control unit 40. The mobile phone 10 further comprises the speaker 16, the camera 26, and the external interface 42 including the audio output terminal 24.

The touch panel 14 has the functions as a display device and an input device. The touch panel 14 comprises a display (display screen) 14A with the display function, and a touch sensor 14B with the input function. The display 14A is a typical display device such as, for example, a liquid crystal display or an organic electro luminescence (EL) display. The touch sensor 14B comprises an element arranged on an upper surface of the display 14A to sense a contact operation, and a transparent operation surface disposed on the element. The touch sensor 14B may adopt an arbitrary one of the existing contact sensing systems of capacitance type, resistive film type (pressure sensitive type), electromagnetic induction type, etc.

The touch panel 14 displays a game image which is generated when the main control unit 40 executes a game program 50 stored in the storage unit 38. The touch panel 14 as the input device accepts an input of an operation by sensing a motion of a contact object (including a player's finger and touch pen; hereinafter, the "finger" will be described representatively) which comes into contact with the operation surface. The touch panel 14 then supplies information of the contact position to the main control unit 40. The motion of the finger is detected as coordinate information indicating the position or area of the contact point. The coordinate information is expressed, for example, as the coordinate values on two axes in the short side and long side directions of the touch panel 14.

The mobile phone 10 can be connected to a network (Internet) N, through the mobile communication antenna 30 or the wireless LAN communication antenna 34, for data communication with a server device 52. The server device 52 functions as a hub server in the game system. More specifically, the server device 52 collects, via the network N, play data of a game performed in the mobile phone 10, and accumulates and manages the play data.

Further, in the embodiment, when the mobile phone 10 is connected to the server device 52 via the network N, an online game system is established which can provide various games online to the mobile phone 10. The online game system manages and offers play data corresponding to a plurality of types of game programs, so that it can provide a player with the enjoyment as if the player were playing a variety of games in a video arcade. The game program 50 according to the embodiment may be installed into the mobile phone 10, or the game function may be provided online from the server (server device 52). In the following, a description will be made, by way of example, of the case where the game program according to the embodiment has already been installed in the mobile phone 10 and the program can be executed without getting connected to the server device 52.

Game Outline

Figure 3:
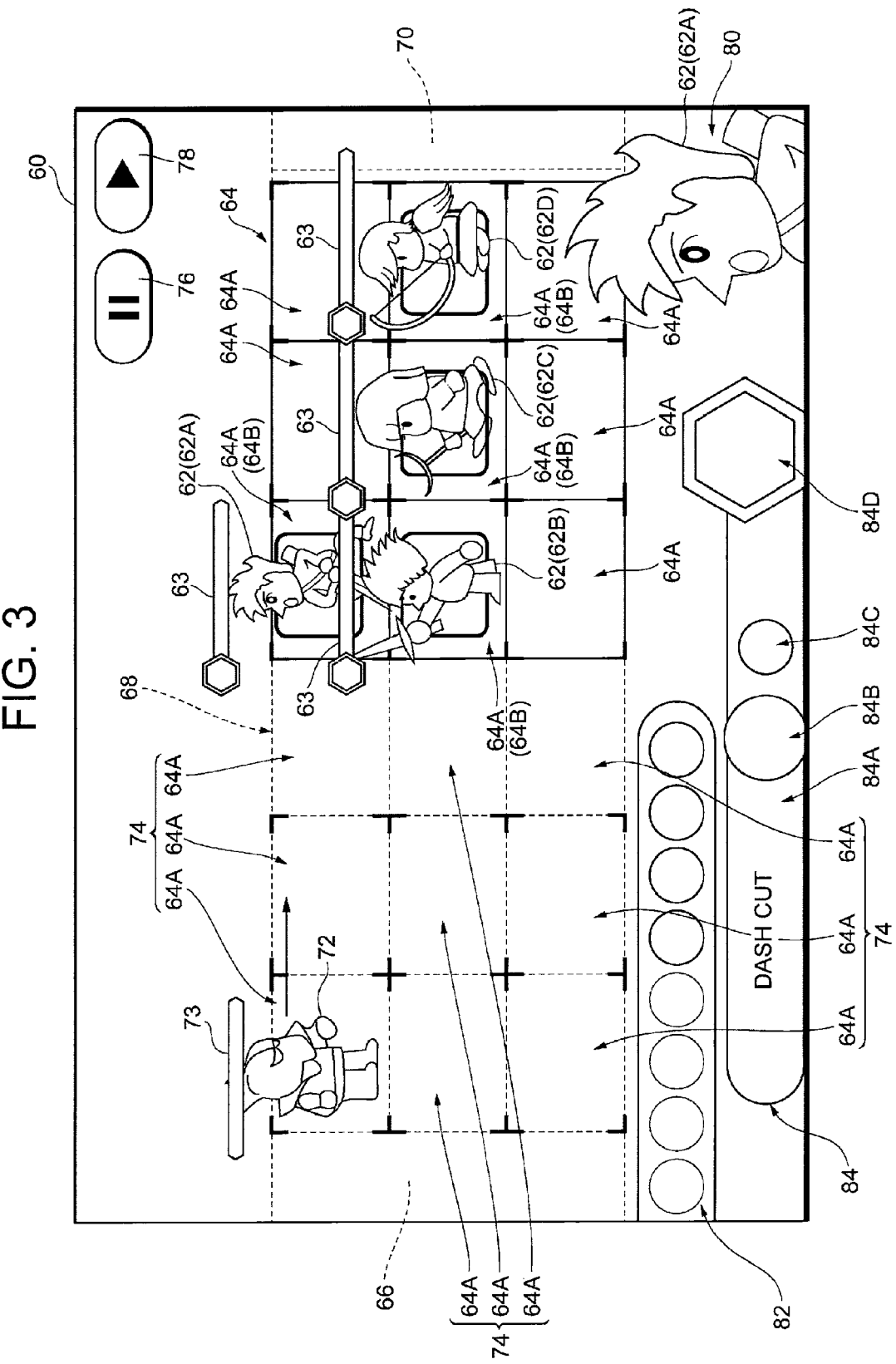
FIG. 3 schematically illustrates a game according to the embodiment.

A game which is implemented when the mobile phone 10 of the embodiment executes the game program 50 will be outlined below. FIG. 3 schematically illustrates the game according to the embodiment.

The game of the embodiment is, as shown in FIG. 3, a so-called "tower defense game" the goal of which is to protect the player's area (end area 70) from enemies by arranging a plurality of types of player characters 62, for example four types of player characters 62A to 62D, in a prescribed area (deployment area 64) in a game area 60 and using the player characters 62A to 62D to intercept a group of enemy characters 72 which appear in an appearance area 66 and move through a moving area 68 toward the player's end area 70.

Specifically, when the tower defense game is started, a part of the game area 60 is displayed on the display 14A.

The game area 60 comprises an end area 70 as a first area in which a target movement position of an enemy character 72 can be set. The end area 70 is arranged, for example, in the vertically central portion in the rightmost area displayed on the display 14A. When an enemy character 72 that moved from the appearance area 66 has reached this end area 70, the game is over, as will be described later.

The game area 60 also comprises a deployment area 64 as a second area in which a home position of a player character 62 can be set. The deployment area 64 is arranged, for example, immediately adjacent to the left of the end area 70. In this deployment area 64, a plurality of squares 64A (for example, nine squares of three rows and three columns) are set as sub-areas in which home positions 64B of the respective player characters 62A to 62D can be set. When one player character 62 is arranged in an empty square 64A, the square 64A becomes the home position 64B of that player character 62.

It should be noted that the "home position 64B" is a reference position from which a player character 62 makes a move. The player character 62 remains in the home position 64B as long as the character takes no action such as a battle.

Above each of the player characters 62A to 62D, a HP bar 63 indicating the hit points (HP) of the corresponding character is arranged. When HP becomes "0", the player character dies, and disappears from the game area 60 (square 64A). This makes it possible for an enemy character 72 to go through the square 64A in which the player character was arranged before death, and further advance toward the end area 70.

The player characters 62A and 62B are melee attack type characters. These player characters 62A and 62B each use a sword or the like to launch a melee attack against an enemy character 72 located in one of the squares 64A immediately adjacent to the square 64A where the player character 62A or 62B is located (or the home position 64B thereof). The player characters 62A and 62B are set such that, for example, the player character 62A is inferior in defensive abilities but superior in moving speed to the player character 62B.

The player character 62C is a magician type character. This player character 62C may launch a magical attack against a remotely located enemy character 72, beyond the concept of the squares 64A, for example. The player character 62C may use magic to restore HP of a player character 62 which is in one of the squares 64A immediately above, below, right, and left of the home position 64B of the player character 62C.

The player character 62D is a ranged attack type character. This player character 62D uses a bow or the like to launch a ranged attack against an enemy character 72 located in a square 64A three squares away (including diagonally away), for example, from the home position 64B of the player character 62D.

As such, the player characters 62A to 62D each have a different range of area in which the player character can fight (range of the squares 64A which the player character can attack or restore), depending on the types of the player characters.

The game area 60 further comprises a moving area 68 as a third area in which a target movement position of each of the player characters 62A to 62D can be set. The moving area 68 is arranged, for example, immediately adjacent to the left of the deployment area 64. In this moving area 68, a plurality of paths 74 are arranged along which the player characters 62A to 62D and enemy characters 72 each move. For example, a path 74 extends straight in a lateral direction (horizontal direction), and three such paths 74 are arranged in a vertical direction (up-and-down direction) in response to the number of vertical squares 64A (i.e. three). This moving area 68 comprises a plurality of squares 64A (for example, nine squares of three rows and three columns) which can make paths 74. Specifically, three squares 64A in a row, for example, make one path 74.

The game area 60 further comprises an appearance area 66 in which an appearance position of an enemy character 72 can be set. The appearance area 66 is arranged, for example, in the vertically central portion in the leftmost area displayed on the display 14A, immediately adjacent to the left of the moving area 68. During the game play, each enemy character 72 appears in this appearance area 66 at a given time, and moves through the moving area 68 toward the end area 70.

The game area 60 further comprises a battle stop/play button 76 and a fast-forward button 78 which respond to a touch on the touch panel 14. The buttons are arranged, for example, in the upper rightmost area displayed on the display 14A. When the battle stop/play button 76 is touched on the touch panel 14, the mode is switched from the current battle mode to a standby mode. When the battle stop/play button 76 is touched again on the touch panel 14, the mode is returned from the standby mode to the battle mode. When the fast-forward button 78 is touched on the touch panel 14, the battle speed is doubled, for example. When the fast-forward button 78 is touched again on the touch panel 14, the battle speed is returned to the normal speed, for example.

The game area 60 further comprises a display area 80 in which the player character 62 currently selected by the player is displayed. The display area 80 is arranged, for example, in the lower rightmost area displayed on the display 14A.

The game area 60 further comprises an available Mana display area 82 in which the types of Mana currently possessed are shown. The available Mana display area 82 is arranged, for example, in the lower leftmost area displayed on the display 14A. It should be noted that "Mana" refers to a resource which is spent when a special weapon is used. There is a plurality of types of Mana.

The game area 60 further comprises a special weapon display area 84 for the player character 62 which is currently selected by the player. The special weapon display area 84 is arranged beneath the available Mana display area 82. In this special weapon display area 84, a special weapon name 84A of the player character 62, such as "Dash Cut" for example, and a range display button 84B which, when touched, displays the effective range of the special weapon (range of the squares 64A) in the battlefield such as the deployment area 64 and the moving area 68, are arranged. Also arranged in the special weapon display area 84 are: a required Mana display field 84C in which the types and number of Mana required for launching the special weapon are displayed, and a special weapon trigger button 84D which launches the special weapon when the button is touched in the state where the player possesses the required Mana.

Functional Configuration

Figure 4:
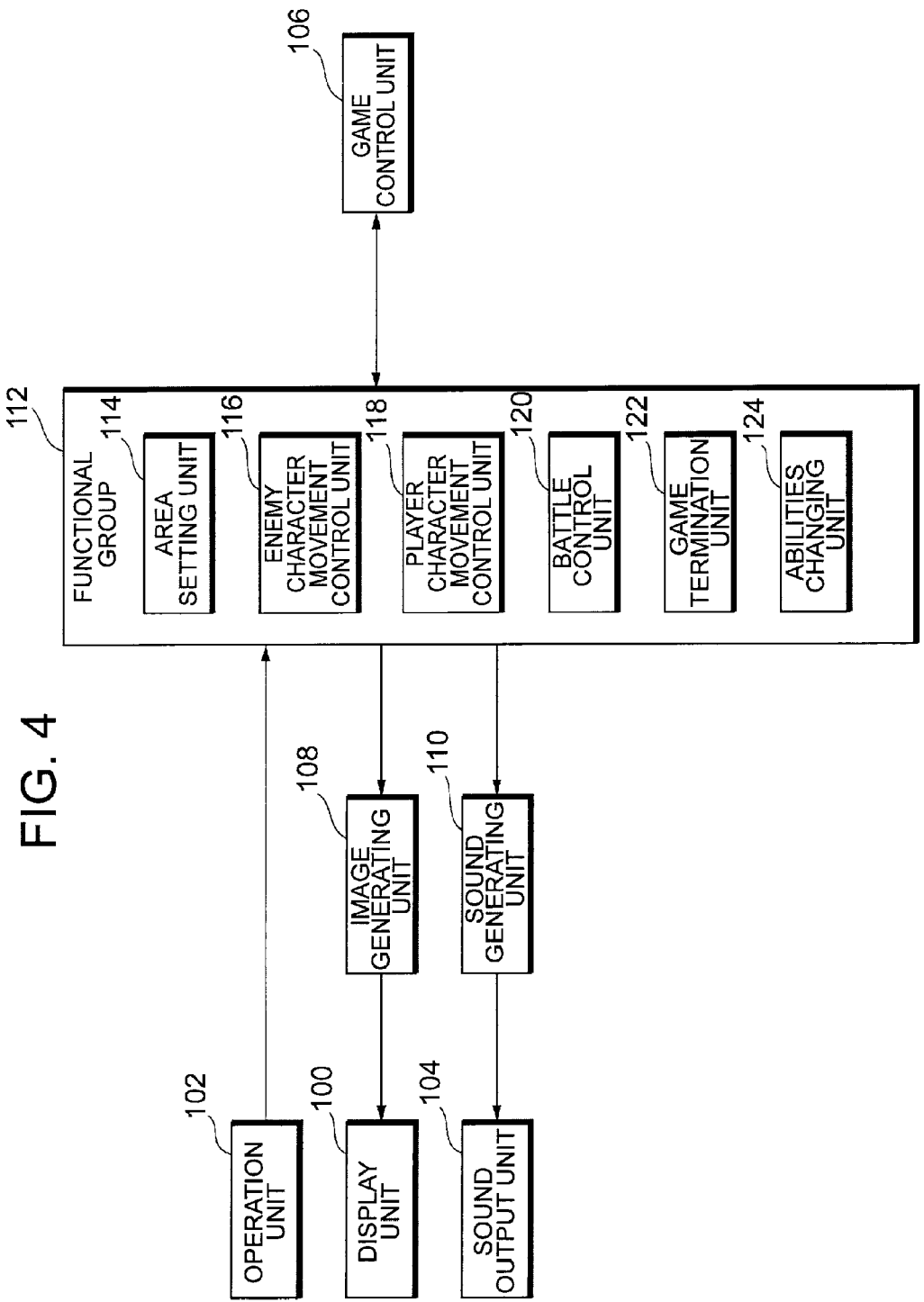
FIG. 4 is a block diagram showing an exemplary functional configuration of the mobile phone according to the embodiment.

The functional configuration of the mobile phone 10 according to the embodiment will be described below. FIG. 4 is a block diagram showing an exemplary functional configuration of the mobile phone 10 according to the embodiment. More specifically, FIG. 4 shows the configuration of various functional units which are implemented in the mobile phone 10 by the main control unit 40 in cooperation with other hardware and software as the main control unit 40 executes the game program 50.

As shown in FIG. 4, the mobile phone 10 comprises, as the functional means which form a user interface, a display unit 100, an operation unit 102, and a sound output unit 104. The mobile phone 10 further comprises a game control unit 106, an image generating unit 108, a sound generating unit 110, and a functional group 112 having a variety of functional units related to the tower defense game implemented by the game program 50 of the embodiment.

The display unit 100 comprises, for example, the display 14A as well as the main control unit 40. This display unit 100 is under the control of the game control unit 106 and functional group 112, and displays, on the screen, at least a part of the game area 60 as a game image on the basis of a signal output from the image generating unit 108.

The operation unit 102 comprises, for example, the touch sensor 14B as well as the main control unit 40. This operation unit 102 receives an operation of a player as the player touches the touch panel 14.

The sound output unit 104 comprises, for example, the speaker 16. This sound output unit 104 is under the control of the game control unit 106 and functional group 112, and produces sound on the basis of a signal output from the sound generating unit 110.

The game control unit 106 starts a tower defense game implemented by the game program 50, and performs overall control of the progress of the game.

The image generating unit 108 generates a variety of images including a game image indicating the game area 60, on the basis of image data output from the functional group 112, and outputs the images to the display unit 100.

The sound generating unit 110 generates game sound on the basis of sound data output from the functional group 112, and outputs the game sound to the sound output unit 104.

The functional group 112 comprises an area setting unit 114, an enemy character movement control unit 116, a player character movement control unit 118, a battle control unit 120, a game termination unit 122, and an abilities changing unit 124. These functional units will be schematically described below. Specific operations thereof will be described later.

The area setting unit 114 sets a game area 60 comprising a deployment area 64, moving area 68, end area 70, etc., as shown in FIG. 3.

The enemy character movement control unit 116 sequentially or simultaneously sets initial positions of a plurality of enemy characters 72 in an area within the game area 60 other than the end area 70 and the deployment area 64, which is for example an area not shown in FIG. 3 in the embodiment. The enemy character movement control unit 116 also sets target movement positions of all the enemy characters 72 that have been set, in the end area 70, and controls each enemy character 72 to move sequentially from the initial position to the target movement position. This causes each enemy character 72 to appear in the appearance area 66 and move through the moving area 68 toward the end area 70. During this movement, each enemy character 72 is configured to move straight on one of a plurality of paths 74.

The player character movement control unit 118 places the player characters 62A to 62D in the corresponding squares 64A, to set their home positions 64B in the deployment area 64. In response to an operation input to the operation unit 102, the player character movement control unit 118 sets a target movement position of the corresponding player character 62 in the moving area 68. After setting the target movement position of the player character 62, the player character movement control unit 118 controls the player character 62 to move from the home position 64B toward the target movement position thus set.

Further, in the case where a predetermined condition is met after the player character 62 has moved to the target movement position, the player character movement control unit 118 controls the player character 62 to move from the current position to the deployment area 64, as will be described later. In the embodiment, the player character movement control unit 118 controls the player character 62 to move from the current position to the home position 64B in the deployment area 64.

The battle control unit 120 controls a player character 62 and an enemy character 72 to fight against each other in accordance with a positional relationship therebetween.

The game termination unit 122 terminates the game when a predetermined condition is met, as will be described later.

The abilities changing unit 124 changes the abilities of at least one of the player characters 62A to 62D, in accordance with the formation based on the home positions 64B of the player characters 62A to 62D.

Game Processing

Figure 5:
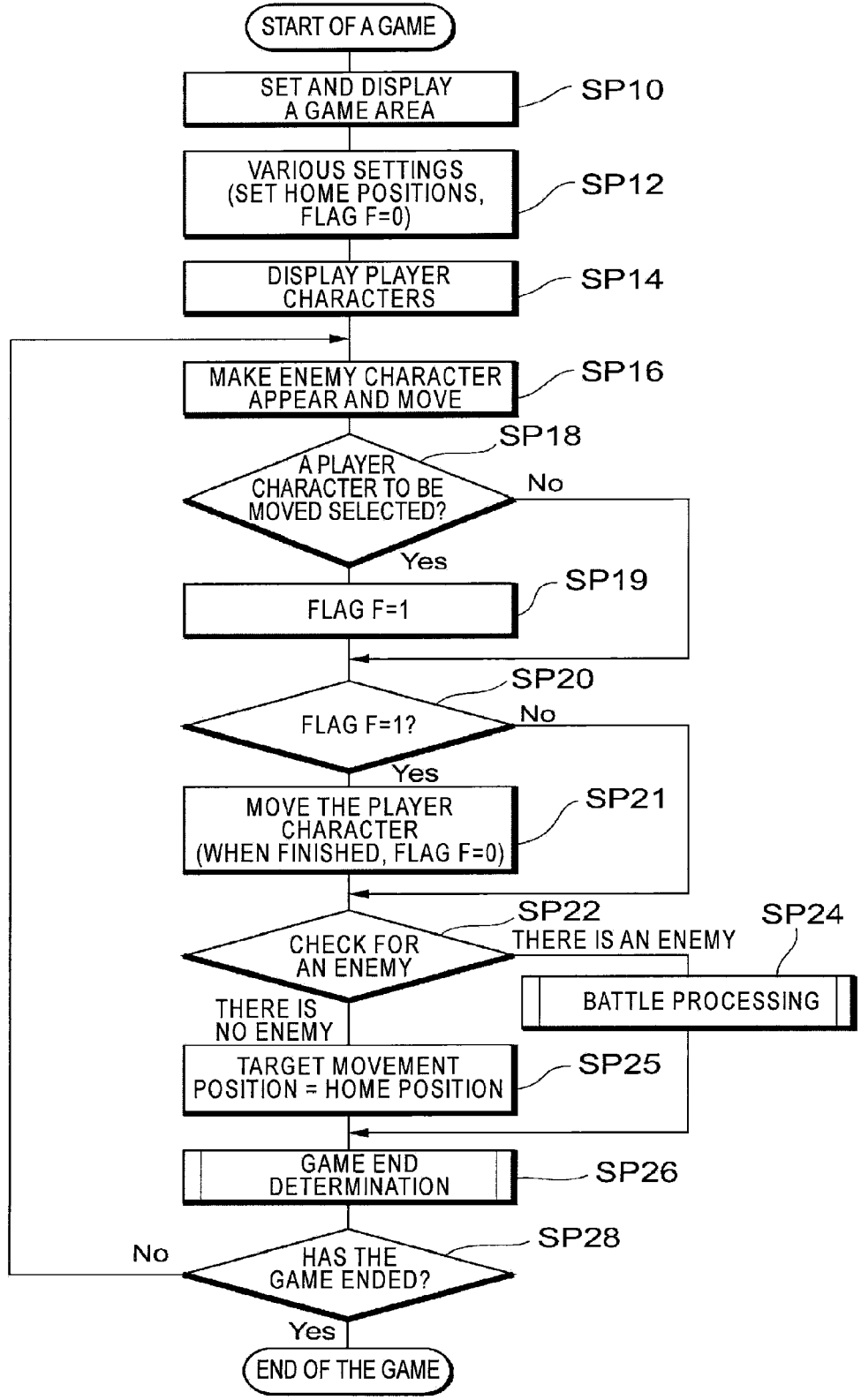
FIG. 5 is a flowchart of the game processing performed by the game control unit.

Game processing performed by the game control unit 106 will now be described. FIG. 5 is a flowchart of the game processing performed by the game control unit 106. In the following description, the identification signs in parentheses correspond to the step identification signs in FIG. 5. This game processing is started when a player selects a story from a menu screen (not shown) of the tower defense game.

(SP10) The game control unit 106 passes control to the area setting unit 114. The area setting unit 114, which has gained control, sets a game area 60 as shown in FIG. 3. The area setting unit 114 also sets, in the game area 60, at least an end area 70 in which a target movement position of an enemy character 72 can be set, a deployment area 64 in which a home position 64B of a player character 62 can be set, and a moving area 68 in which a target movement position of a player character 62 can be set. In the embodiment, the area setting unit 114 also sets an appearance area 66, an available Mana display area 82, and a special weapon display area 84 in the game area 60.

When setting the game area 60, the area setting unit 114 sets, in the deployment area 64, a plurality of areas (squares 64A) (for example, squares of three rows and three columns) which can become home positions 64B. The area setting unit 114 also sets, in the moving area 68, a plurality of paths 74 on which an enemy character 72 may move. The area setting unit 114 sets the number of the paths 74 to correspond to the number of the areas (squares 64A) which can become home positions 64B. For example, three paths are set corresponding to the three squares in a column.

The area setting unit 114 then returns control to the game control unit 106. The game control unit 106 displays, as a game image, at least a part of the resultant game area 60 (for example, the range shown in FIG. 3) on the display unit 100 via the image generating unit 108. The game control unit 106 then proceeds to the next step SP12.

(SP12) The game control unit 106 sets a flag F to "0" (F=0), and passes control to the enemy character movement control unit 116 and the player character movement control unit 118 for various settings. The enemy character movement control unit 116, which has gained control, sets initial positions of enemy characters 72 sequentially or simultaneously in an area in the game area 60 other than those areas shown in FIG. 3, or more specifically, in an area (not shown) immediately adjacent to the left of the appearance area 66. The player character movement control unit 118, which has gained control, sets home positions 64B predetermined by the player in the deployment area 64. When the enemy character movement control unit 116 and the player character movement control unit 118 have finished the settings, they return control to the game control unit 106. The game control unit 106 then proceeds to the next step SP14.

(SP14) The game control unit 106 displays player characters 62 which are located in the home positions 64B set in the game area 60, on the display unit 100 via the image generating unit 108. The game control unit 106 then proceeds to the next step SP16.

(SP16) The game control unit 106 passes control to the enemy character movement control unit 116. The enemy character movement control unit 116, which has gained control, performs control such that each enemy character 72 moves from its initial position toward a target movement position (end area 70) which has been set. In response, the game control unit 106 causes a plurality of enemy characters 72, located in the initial positions set, to appear in the appearance area 66 at a given time. More specifically, the game control unit 106 displays the enemy characters 72 on the display unit 100, via the image generating unit 108, in such a manner that each enemy character 72 appears in the appearance area 66 at a given time. The enemy character movement control unit 116 then returns control to the game control unit 106. The game control unit 106 proceeds to the next step SP18.

(SP18) The game control unit 106 determines whether a "move selection" of a player character 62 has been accepted. The "move selection" is the player's operation of touching (selecting), on the touch panel 14, a player character 62 which the player wishes to move, and then touching a target movement position of the player character 62, which may be an enemy character 72 or an empty square 64A in the moving area 68. Alternatively, the "move selection" may be the player's operation of touching, on the touch panel 14, a player character 62 which the player wishes to move, and then dragging the player character 62 to its target movement position, which may be an enemy character 72 or an empty square 64A in the moving area 68.

If the determination result is "Yes", the game control unit 106 passes control to the player character movement control unit 118. The player character movement control unit 118, which has gained control, is operable, in response to the above-described ("move selection") operation, to set the target movement position of the player character 62 in the moving area 68. The player character movement control unit 118 then proceeds to step SP19. If the determination result is "No", the game control unit 106 proceeds to step SP20.

(SP19) The player character movement control unit 118 sets the flag F to "1" (F=1). The player character movement control unit 118 then proceeds to the next step SP20.

(SP20) The player character movement control unit 118 determines whether the flag F indicates "1" (F=1). The player character movement control unit 118 then proceeds to the next step. If the determination result is "Yes", the player character movement control unit 118 proceeds to step SP21. If the determination result is "No", the player character movement control unit 118 proceeds to step SP22.

(SP21) The player character movement control unit 118 controls the player character 62 to move from the home position 64B toward the target movement position which has been set.

Figure 9:
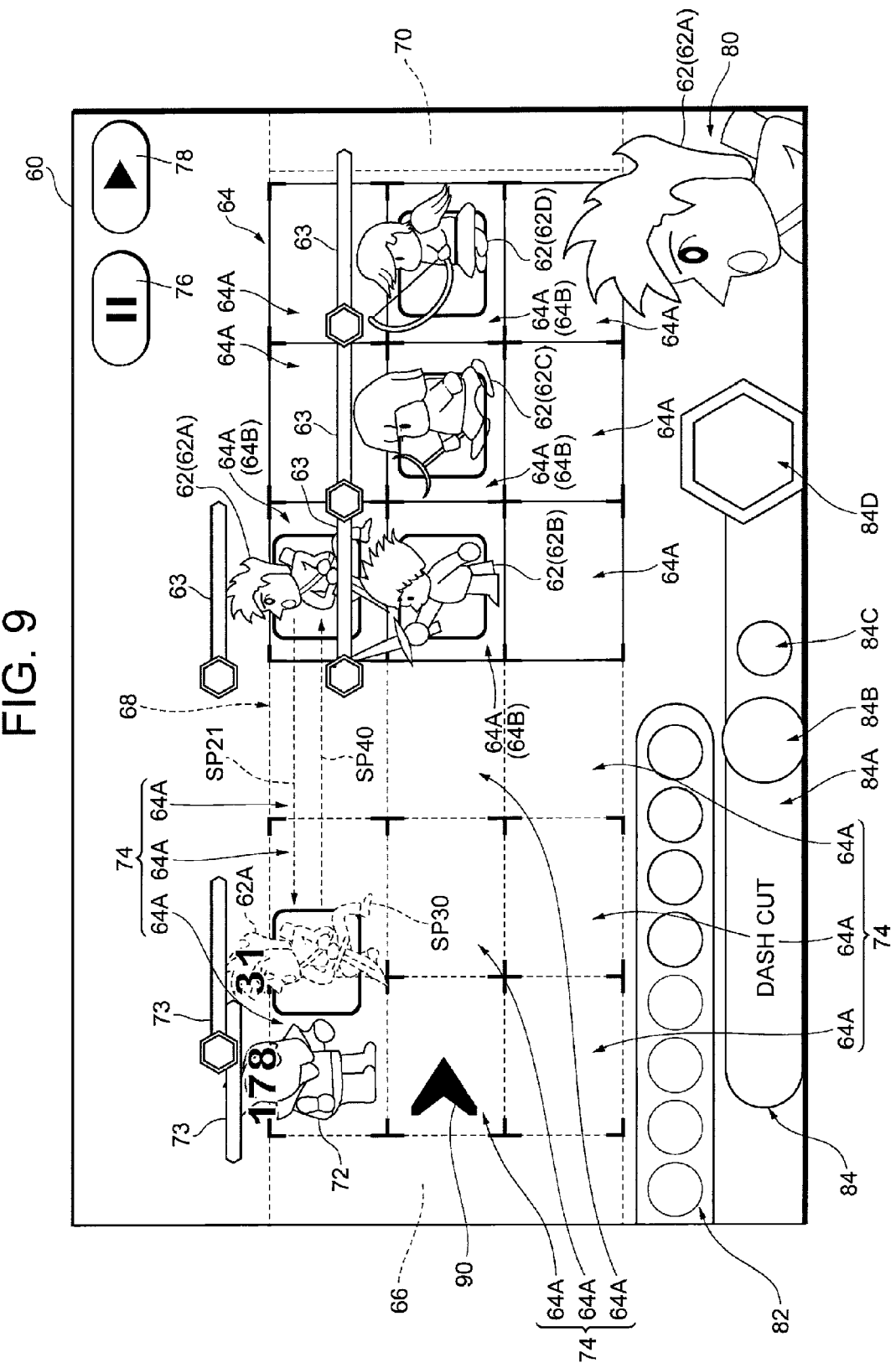
FIG. 9 shows how steps SP21, SP30, and SP40 are performed in the game area shown in FIG. 3.

For example, in the case where the selected player character 62 is the player character 62A and the target movement position is (the current position of) an enemy character 72, the player character movement control unit 118 controls the player character 62A such that it moves straight on the path 74 to the position (square 64A) immediately adjacent to the enemy character 72 by tracking the movement of the enemy character 72, as shown in FIG. 9.

Figure 10:
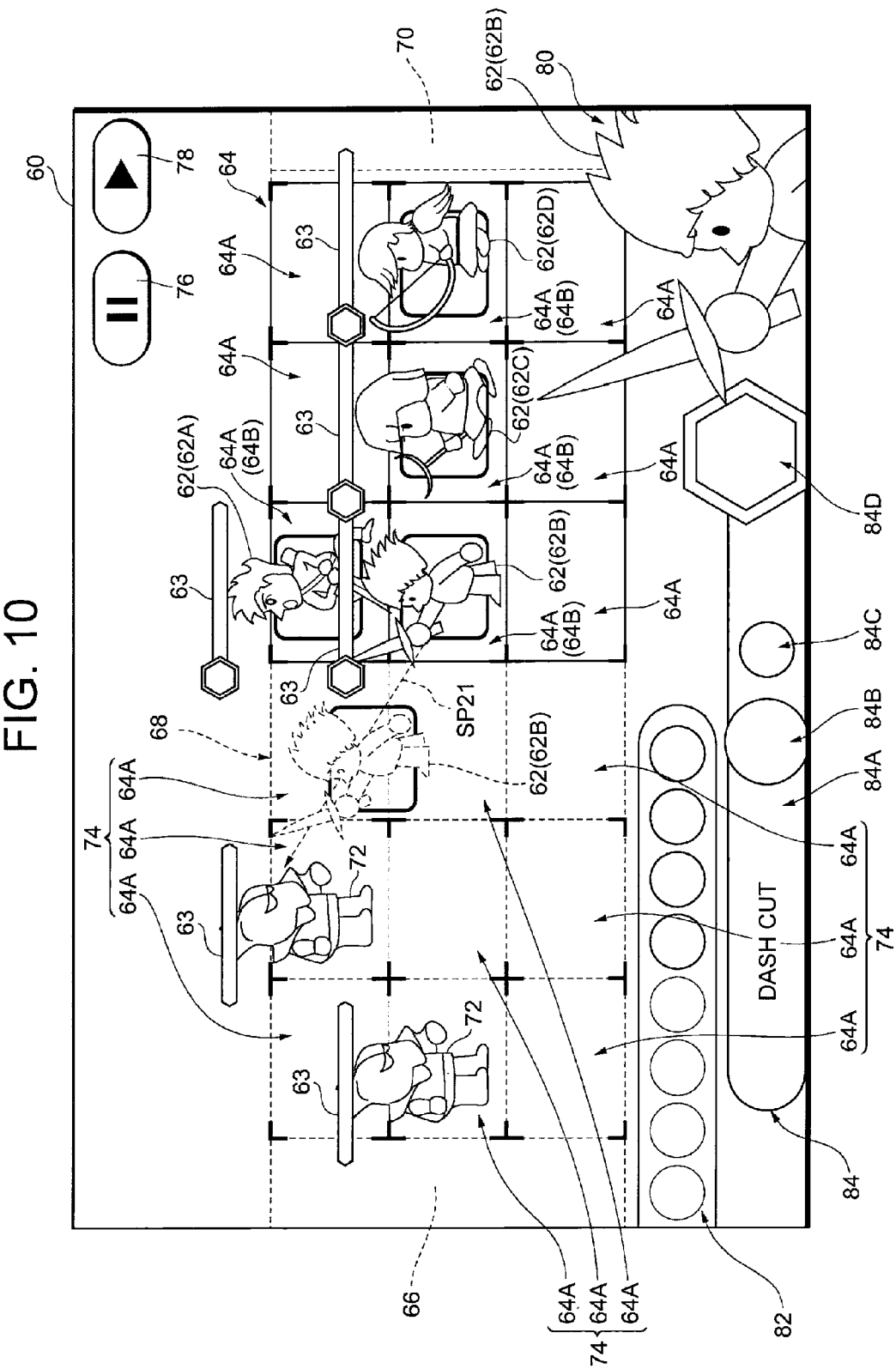
FIG. 10 shows how step SP21 is performed in the game area shown in FIG. 3.

In the case where the selected player character 62 is the player character 62B and the target movement position is (the current position of) an enemy character 72, the player character movement control unit 118 controls the player character 62B such that it moves diagonally across the middle path 74 and the upper path 74 among the three paths 74 to the position (square 64A) immediately adjacent to the enemy character 72 by tracking the movement of the enemy character 72, as shown in FIG. 10.

In the case where the target movement position of a selected player character 62 is another square 64A within the deployment area 64, the player character movement control unit 118 moves the selected player character 62 to the square 64A, and changes the home position 64B of the player character 62 to the square 64A.

While a player character 62 is moved, the walking or running player character 62 is displayed on the display unit 100.

Further, while a player character 62 is moved, the player character movement control unit 118 changes the moving speed of the player character 62 in accordance with the type of the selected player character 62. For example, the speeds of the respective player characters are set in descending order of the player character 62A, player character 62B, player character 62D, and player character 62C. The player character movement control unit 118 changes the moving speed of a player character 62 on the basis of this setting.

With this configuration, when the determination result in step SP28 (described later) is "No" and step SP21 is repeated a plurality of times, the selected player character 62 moves to the target movement position. At that time, the player character movement control unit 118 sets the flag F to "0" (F=0).

It should be noted that in FIG. 9, an appearance mark 90 is displayed on the middle path 74 in the moving area 68 by the processing performed by the enemy character movement control unit 116. This appearance mark 90 is for notifying the player that an enemy character 72 will appear in the appearance area 66 two seconds later, for example, as shown in FIG. 10, and that the enemy character 72 will move on the middle path 74.

The player character movement control unit 118 then returns control to the game control unit 106. The game control unit 106 proceeds to the next step SP22.

(SP22) The game control unit 106 passes control to the battle control unit 120. The battle control unit 120, which has gained control, checks for an enemy. In the embodiment, the battle control unit 120 determines that there is an enemy in the case where, for example in FIG. 3, an enemy character 72 has moved to one of the neighboring squares 64A including those immediately above, below, right, and left of the square 64A in which the player character 62 is located. The battle control unit 120 also determines that there is an enemy in the case where an enemy character 72 has come into the effective range of a ranged attack made with a bow or magic by the player character 62C, 62D, or the like. Otherwise, the battle control unit 120 determines that there is no enemy. If the battle control unit 120 determines that there is an enemy, it proceeds to step SP24. If the battle control unit 120 determines that there is no enemy, it proceeds to step SP25.

(SP24) The battle control unit 120 starts battle processing. The detailed processing will be described later in conjunction with FIG. 6.

(SP25) In the case where F=0, the battle control unit 120 passes control to the player character movement control unit 118. The player character movement control unit 118, which has gained control, changes a target movement position from the currently set target movement position (for example, empty square 64A) to the home position 64B where the player character 62 was located in the deployment area 64 (that is, it sets the home position 64B as a new target movement position), and sets the flag F to "1". The player character movement control unit 118 then proceeds to step SP26.

With this configuration, when the above-described step SP21 is performed afterwards, the player character movement control unit 118 controls the player character 62 to move (return) to the home position 64B where the player character 62 was located in the deployment area 64.

In the case where F=1, the battle control unit 120 proceeds to step SP26, without performing the above-described process for making the player character return to the home position afterwards.

(SP26) The battle control unit 120 returns control to the game control unit 106. The game control unit 106 passes control to the game termination unit 122. The game termination unit 122, which has gained control, performs game end determination. The detailed processing will be described later in conjunction with FIG. 7.

(SP28) The game control unit 106 determines whether the result of the game end determination by the game termination unit 122 indicates that the game has ended. If the determination result is "Yes", the game control unit 106 terminates the game via the game termination unit 122. If the determination result is "No", the game control unit 106 returns to step SP16.

Figure 6:
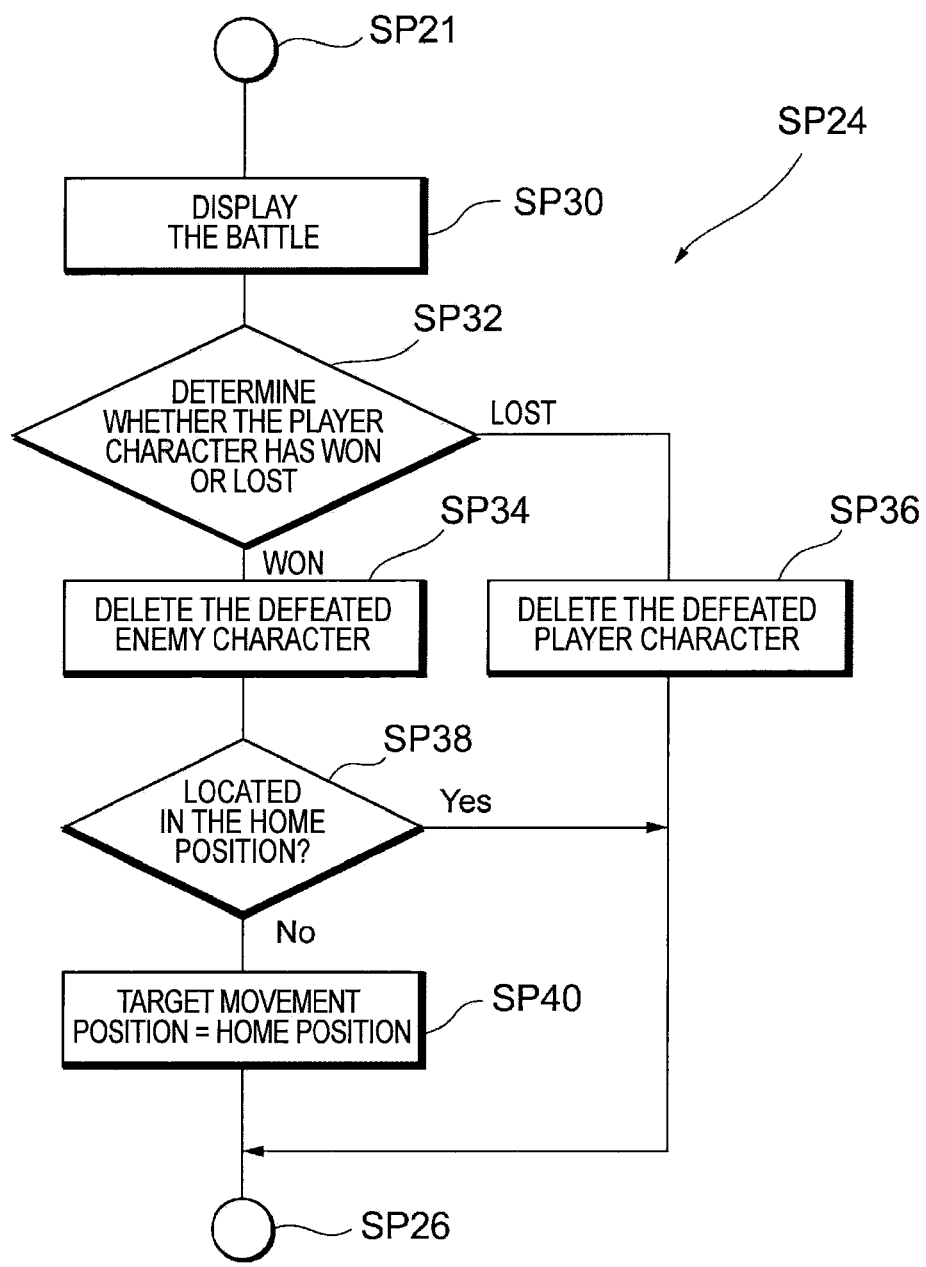
FIG. 6 is a flowchart of the battle processing performed in step SP24 in FIG. 5.

The battle processing in step SP24 in FIG. 5 will now be described in detail. FIG. 6 is a flowchart of the battle processing performed in step SP24 in FIG. 5. The identification signs in parentheses in the following description correspond to the step identification signs shown in FIG. 6.

(SP30) The battle control unit 120 makes a player character 62 and an enemy character 72 fight against each other on the basis of their abilities. The battle control unit 120 displays the battle scene on the display unit 100 via the image generating unit 108. At this time, the battle control unit 120 also displays the values of damages applied to each other, and changes the display of their HP bars 63 in accordance with the damages suffered. The battle control unit 120 then proceeds to the next step SP32.

It should be noted that the "abilities" include, for example, HP, offensive abilities when applying damages to opponents, defensive abilities when receiving damages from opponents, and agility for avoiding attacks from the opponents. The abilities are set for each player character 62 and each enemy character 72.

During the battle, the battle control unit 120 changes the ranges of areas in which the player characters 62A to 62D can fight against enemies, in accordance with the types of the player characters 62A to 62D. Specifically, in the case where the player character 62 who fights is the player character 62A or 62B, the battle control unit 120 changes an attack range of the player character to the squares 64A (or any enemy character 72 positioned therein) immediately above, below, right, and left of the square 64A in which the player character is in. Besides the squares 64A immediately above, below, right, and left, the squares 64A diagonally adjacent to the square 64A where the player character is located may be added, such that the attack range includes the squares surrounding the square 64A where the player character is in. In the case where the player character 62 who fights is the player character 62C, the battle control unit 120 changes an attack range of the player character to, for example, all the squares 64A within the game area 60. In the case where the player character 62 who fights is the player character 62D, the battle control unit 120 changes an attack range of the player character to, for example, the squares 64A three squares away (including diagonally away) from the home position 64B of the player character.

(SP32) The battle control unit 120 determines whether the player character 62 has won or lost in the battle against the enemy character 72. If it is determined that the player character 62 has won, the process proceeds to step SP34. If it is determined that the player character 62 has lost, the process proceeds to step SP36.

It should be noted that if HP of the enemy character 72 becomes "0", the player character 62 wins. If HP of the player character 62 becomes "0", the player character 62 loses.

(SP34) The battle control unit 120 deletes the defeated enemy character 72 from the game area 60. The battle control unit 120 then proceeds to the next step SP38. Another character can now go through the position (square 64A) from which the enemy character 72 was deleted.

(SP36) The battle control unit 120 deletes the defeated player character 62 from the game area 60. The battle control unit 120 then proceeds to the step SP26 shown in FIG. 5. Another character can now go through the position (square 64A) from which the player character 62 was deleted.

(SP38) The battle control unit 120 passes control to the player character movement control unit 118. The player character movement control unit 118, which has gained control, determines whether the player character 62 that has won is located in its home position 64B. If the determination result is "Yes", the player character movement control unit 118 proceeds to the step SP26 shown in FIG. 5. If the determination result is "No", the player character movement control unit 118 proceeds to step SP40.

(SP40) The player character movement control unit 118 changes a target movement position from the currently set target movement position (for example, the current position of an enemy character) to the home position 64B where the player character 62 was located in the deployment area 64 (i.e., it sets the home position 64B as a new target movement position), and sets the flag F to "1". The player character movement control unit 118 then proceeds to the step SP26 shown in FIG. 5.

With this configuration, when the above-described step SP21 is performed afterwards, the player character movement control unit 118 controls the player character 62 to move (return) to the home position 64B where the player character 62 was located in the deployment area 64.

Figure 7:
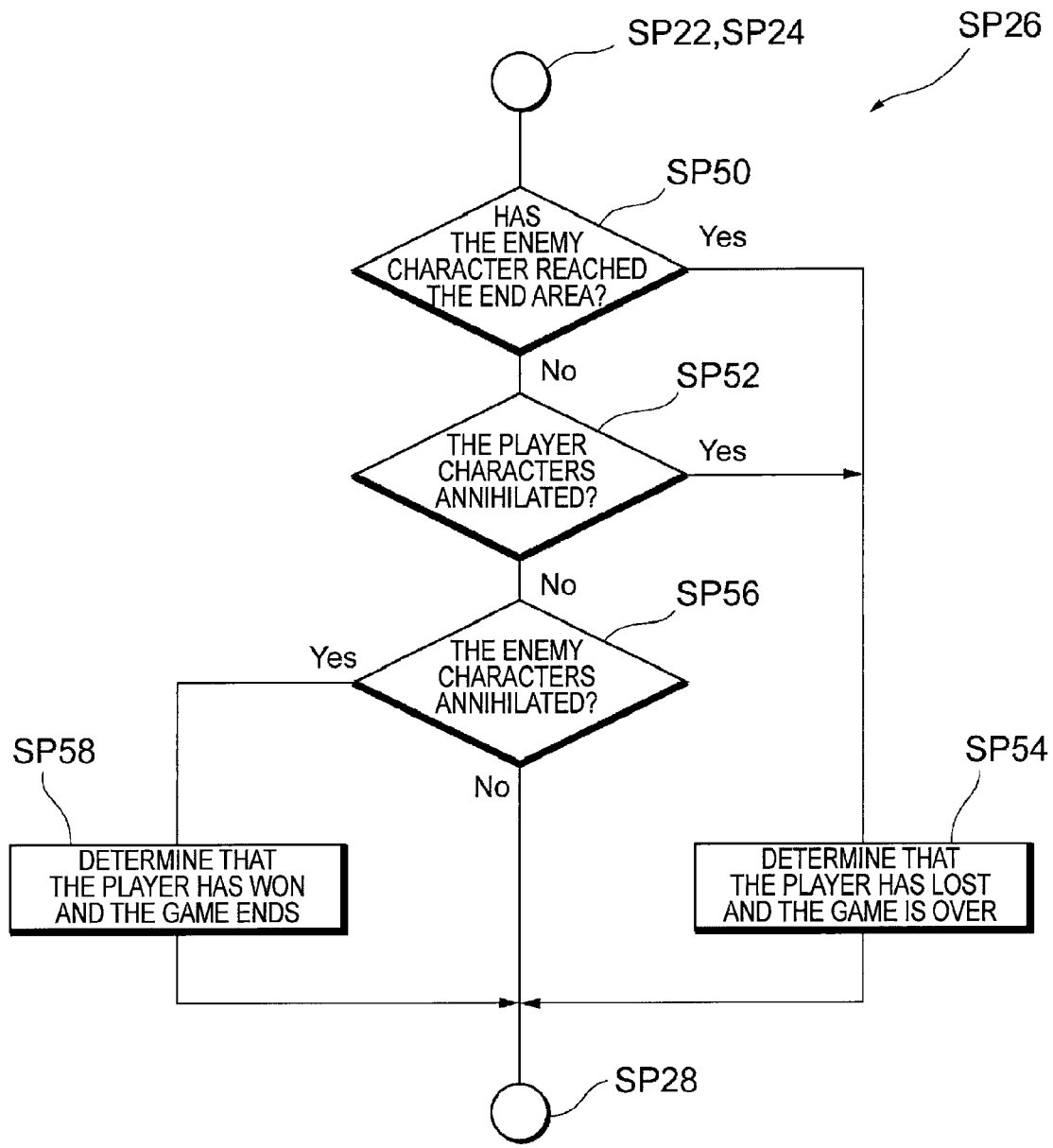
FIG. 7 is a flowchart of the game end determination performed in step SP26 in FIG. 5.

The game end determination in step SP26 in FIG. 5 will now be described in detail. FIG. 7 is a flowchart of the game end determination performed in step SP26 in FIG. 5. The identification signs in parentheses in the following description correspond to the step identification signs shown in FIG. 7.

(SP50) The game control unit 106 passes control to the game termination unit 122. The game termination unit 122, which has gained control, determines whether an enemy character 72 has reached the end area 70. If the determination result is "Yes", the game termination unit 122 proceeds to step SP54. If the determination result is "No", the game termination unit 122 proceeds to step SP52.

(SP52) The game termination unit 122 determines whether the player characters 62 have been annihilated. If the determination result is "Yes", the game termination unit 122 proceeds to step SP54. If the determination result is "No", the game termination unit 122 proceeds to step SP56. It should be noted that "annihilation" above means that, in addition to the player characters 62A to 62D present within the game area 60, one or more (for example two) player characters that stand by as backups have all died.

(SP54) The game termination unit 122 determines that the player has lost the game and that the game is over. The game termination unit 122 then proceeds to the step SP28 shown in FIG. 5.

(SP56) The game termination unit 122 determines whether the enemy characters 72 have been annihilated. If the determination result is "Yes", the game termination unit 122 proceeds to step SP58. If the determination result is "No", the game termination unit 122 proceeds to the step SP28 shown in FIG. 5.

(SP58) The game termination unit 122 determines that the player has won the game and that the game ends. The game termination unit 122 then proceeds to the step SP28 shown in FIG. 5.

Figure 8:
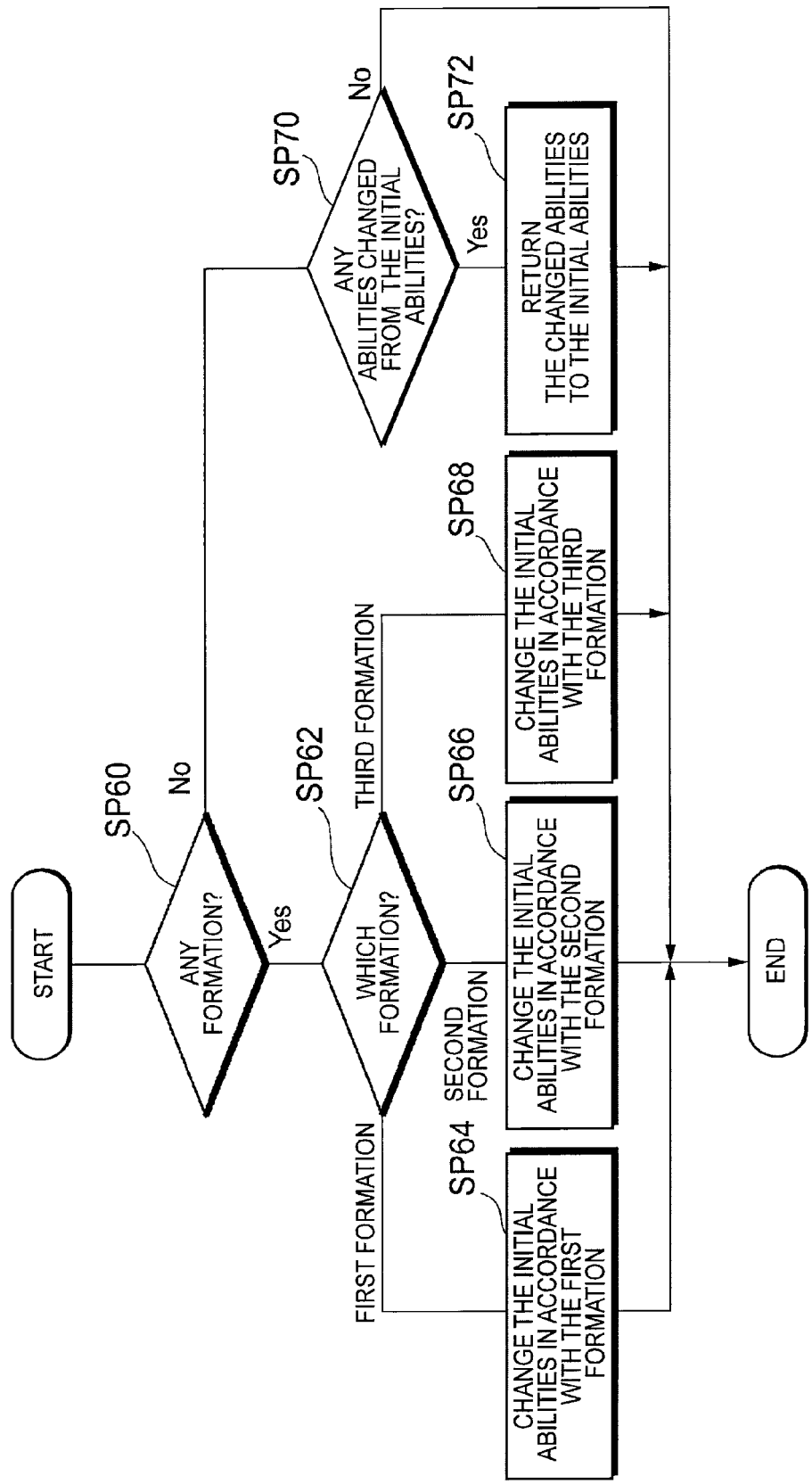
FIG. 8 is a flowchart of the processing performed by the abilities changing unit.

The processing performed by the abilities changing unit 124 will now be described in detail. FIG. 8 is a flowchart of the processing performed by the abilities changing unit 124. The identification signs in parentheses in the following description correspond to the step identification signs shown in FIG. 8. This processing is performed every 0.5 seconds, for example, during the execution of the game processing shown in FIG. 5.

(SP60) The abilities changing unit 124 refers to a database (not shown) to determine whether there is a current formation based on the home positions 64B of the player characters 62A to 62D. If the determination result is "Yes", the abilities changing unit 124 proceeds to step SP62. If the determination result is "No", the abilities changing unit 124 proceeds to step SP70.

(SP62) The abilities changing unit 124 refers to a database (not shown) to determine, for example, to which one of three formations of first, second, and third formations the current formation based on the home positions 64B of the player characters 62A to 62D corresponds. While only three formations are described in the embodiment, there may be other formations. If the abilities changing unit 124 determines that the current formation is the first formation, the process proceeds to step SP64. If the abilities changing unit 124 determines that the current formation is the second formation, the process proceeds to step SP66. If the abilities changing unit 124 determines that the current formation is the third formation, the process proceeds to step SP68.

(SP64) The abilities changing unit 124 refers to a database (not shown) to change initial abilities of at least one player character 62 among the player characters 62A to 62D on the basis of the first formation. In the embodiment, offensive abilities of all the player characters 62A to 62D are improved. The abilities changing unit 124 then finishes the whole processing.

(SP66) The abilities changing unit 124 refers to a database (not shown) to change initial abilities of at least one player character 62 among the player characters 62A to 62D on the basis of the second formation. In the embodiment, defensive abilities of all the player characters 62A to 62D are improved. The abilities changing unit 124 then finishes the whole processing.

(SP68) The abilities changing unit 124 refers to a database (not shown) to change initial abilities of at least one player character 62 among the player characters 62A to 62D on the basis of the third formation. In the embodiment, HP of all the player characters 62A to 62D is increased. The abilities changing unit 124 then finishes the whole processing.

(SP70) The abilities changing unit 124 determines whether the initial abilities of at least one player character 62 among the player characters 62A to 62D have been changed. If the determination result is "Yes", the abilities changing unit 124 proceeds to step SP72. If the determination result is "No", the abilities changing unit 124 finishes the whole processing.

(SP72) The abilities changing unit 124 determines that the formation has been broken (that the home positions 64B of the player characters 62A to 62D do not match any formation), and returns the current abilities of the player character (s) 62 to those before being changed, i.e. to the initial abilities. The abilities changing unit 124 then finishes the whole processing.

Effects

The effects of the mobile phone 10 according to the embodiment of the invention will now be described.

According to the mobile phone 10 of the embodiment, in a tower defense game, when a predetermined condition is met after a player character 62 has moved to a target movement position that was set, the player character movement control unit 118 controls the player character 62 to move from the current position (target movement position) to the deployment area 64 including the home position 64B.

With this configuration, when a predetermined condition is met after the end of a battle, the player character 62 moves to the deployment area 64. This can reduce the number of operations required for holding the player characters ready for interception, so that the operability for the player improves.

As the player character 62 moves to the deployment area 64 when a predetermined condition is met after the end of a battle, compared to the case where the player character does not move after the end of the battle, the player characters 62 and the enemy characters 72 are prevented from fighting in close proximity. This facilitates the player's operation of selecting a player character 62 and subsequent operations, and accordingly, ease of operation of the player characters 62 improves. Further, as the fighting in close proximity can be restricted as explained above, the player can easily recognize the development of the game.

The player character movement control unit 118 sets the current position of an enemy character 72 as a target movement position of a player character 62. This enables the player character 62 to move toward the enemy character 72 by tracking the movement of the enemy character 72. This can reduce the number of player operations of selecting the enemy character 72 (setting it as a target movement position) in accordance with the movements of the enemy character 72, so that the operability for the player improves.

The deployment area 64 comprises a plurality of squares 64A in which the home position 64B can be set. The area setting unit 114 sets a plurality of paths 74 for the enemy characters 72 to move thereon, in the moving area 68. At this time, the area setting unit 114 sets the number of the paths 74 to correspond to the number of the squares 64A in the deployment area 64. This allows the player to easily develop a game strategy.

Further, the player character movement control unit 118 controls a player character 62 to move across a path (for example, the middle path) and another path (for example, the upper path) among the plurality of paths 74, as shown in FIG. 10. This enables the player character 62 to fight against any enemy characters 72 moving on the paths at any time. For example, in FIG. 10, the player character 62B can fight against the enemy character 72 which is moving on the upper path 74, and then fight against the enemy character 72 which is moving on the middle path 74.

Further, the abilities changing unit 124 changes the abilities of at least one player character 62 among the player characters 62A to 62D, in accordance with the formation based on the home positions 64B of the player characters 62A to 62D. This encourages the player to consider how to move the respective player characters 62A to 62D by taking into account the formation during the game play. The player character movement control unit 118 performs the control such that after a player character 62 has moved to a set target movement position, the player character 62 moves to the deployment area 64 including the home position 64B. Accordingly, even if the formation is broken, the player can readily return the player characters to the original formation, or the player can readily change the formation to another formation.

At the time when the player character movement control unit 118 moves the player character 62 to the deployment area 64, the player character movement control unit 118 causes the player character 62 to move to the home position 64B where the character was originally located. When the formation is broken, the abilities changing unit 124 returns the changed abilities of the player character(s) 62 to the abilities before the change. This configuration encourages the player to vigorously set up a formation and maintain the formation as long as possible. Even if a player character 62 moves, it returns to the home position 64B. This allows the player to maintain the set formation.

Further, the player character movement control unit 118 changes the home position 64B of a player character 62 within the deployment area 64 in response to an operation input to the operation unit 102. With this configuration, during the game play, the player can change the home positions 64B of the player characters 62 to change the current formation to various formations, to thereby address the development of the game. This can improve the amusement of the game.

The battle control unit 120 changes the ranges of areas in which the player characters 62 can fight, in accordance with the types of the player characters 62. As the ranges of areas in which the respective player characters 62 can fight are changed, the home positions 64B of the player characters 62 become more important. Specifically, each player character 62 returns to the home position 64B after the movement, allowing the player to readily recognize the ranges of areas in which the respective player characters 62 can fight.

Further, the player character movement control unit 118 changes the moving speeds of the player characters 62 in accordance with the types of the player characters 62. This will require the player to develop a game strategy by taking into account not only the time necessary for a player character to move to the target movement position but also the time necessary for the player character to return to the home position 64B. This can further improve the amusement of the game.

Modifications

While the embodiment of the inventive technique has been described above, the inventive technique is not limited to the one described above.

For example, it has been described that, in step SP40 in FIG. 6, the player character movement control unit 118 causes the player character 62 to return to the home position 64B after the battle. Alternatively, the player character movement control unit 118 may cause the player character 62 to return to the home position 64B in response to an operation input to the operation unit 102 during the battle. In this case, it may be configured such that the player character 62 returns to the home position 64B with a simple operation of touching or flicking on the player character 62 once. With this configuration, even if the player characters 62 and the enemy characters 72 fight in close proximity, the operation of selecting a player character 62 and the subsequent operations become easy and, therefore, ease of operation of the player characters 62 improves. The player character movement control unit 118 may set the target movement position or return position on the basis of the distance of the flick.

Further, although it has been described that the game area 60 includes the appearance area 66, the appearance area 66 may be omitted. Similarly, the stop/play button 76, the fast-forward button 78, the display area 80, the available Mana display area 82, and the special weapon display area 84 may be omitted as well.

Further, although it has been described that a plurality of player characters 62 appear in the game play, only one player character may appear.

The abilities changing unit 124 may be configured to change the abilities of a player character 62 depending on the direction in which an enemy character 72 comes into contact with (adjacent to) the player character 62. For example, in the case where an enemy character 72 comes next to the side of the player character 62D (immediately above or below the player character 62D in FIG. 3), the abilities changing unit 124 may reduce the offensive abilities of the player character 62D. In the case where an enemy character 72 comes immediately behind a prescribed player character (right of the player character 62 in FIG. 3), the abilities changing unit 124 may reduce the defensive abilities of the player character 62. This encourages the player to actively maintain or change the formation, leading to improved amusement of the game.

Further, the abilities of a player character 62 may additionally include health points, and the player character movement control unit 118 may use the health points when moving the player character 62. The player character movement control unit 118 may be configured not to move a player character 62 when the health points of the character become "0". This encourages the player to more thoroughly consider how to move the player characters 62, which also leads to improved amusement of the game.

The player character movement control unit 118 may also be configured to move a player character 62 only after a prescribed time, ten seconds for example, has passed from the last move.

While the target movement position of a player character 62 has been described to be (the position of) an enemy character 72, it may be a square 64A or a position of arbitrary coordinates in the moving area 68.

Further, while it has been described that the enemy character movement control unit 116 moves an enemy character 72 on a path 74 made up of a plurality of squares 64A, it may be configured to move the enemy character 72 freely in the moving area 68, beyond the concept of the squares 64A.

While it has been described that the player character movement control unit 118 causes a player character 62 to move sequentially so that the character walks or runs in the moving area 68, it may be configured to cause the player character 62 to move instantaneously as in a space warp.

While it has been described that the enemy character movement control unit 116 causes an enemy character 72 to move straight on a single path, it may be configured such that the enemy character 72 changes the paths midway through the movement. In this case, immediately before the enemy character 72 changes the path, the enemy character movement control unit 116 may notify the player, by means of sound or display, that the enemy character 72 will change the path.

Further, it has been described that the abilities changing unit 124 changes the abilities of at least one of the player characters 62A to 62D in accordance with the formation based on the home positions 64B of the player characters 62A to 62D. Alternatively, the abilities changing unit 124 may be configured to change the abilities of at least one player character only on the conditions that the home positions 64B of the player characters correspond to a certain formation (match the formation) and that all the player characters 62A to 62D are currently in their home positions 64B. Still alternatively, an additional formation of the home positions 64B for changing the abilities of at least one player character may be devised, and this formation may be added as a fourth formation to the branch conditions for the step SP62 shown in FIG. 8. With this configuration, when any of the player characters 62A to 62D moves forward, the formation is broken. This makes it more important for each player character to return to the home position 64B after each battle.

More specifically, it may be configured for example such that the ability of the player character 62C to restore HP by magic is increased by 50% on the conditions that the formation based on the home positions 64B of the player characters 62A to 62D is a fourth formation and that all the player characters 62A to 62D are currently in their home positions. While the fourth formation is effective, when an instruction has been issued to any player character 62, including the player character 62C, to move to an area other than the home position 64B, the abilities changing unit 124 determines that the formation has been broken, and returns the HP restoring ability of the player character 62C to the initial level.

As another example, it may be configured such that HP of the player character 62B is increased by 50% and the ability of the player character 62C to restore HP by magic is also increased by 50% on the conditions that the formation based on the home positions 64B of the player characters 62A to 62D is a fifth formation and that all the player characters 62A to 62D are currently in their home positions. While the fifth formation is effective, when an instruction has been issued to the player character 62C to move to an area other than the home position 64B, the abilities changing unit 124 determines that a part of the formation has been broken, and returns only the HP restoring ability of the player character 62C to the initial level, while maintaining the HP of the player character 62B increased by 50% from the initial level.

As yet another example, it may be configured such that the ability of the player character 62C to restore HP by magic is increased by 50% (i.e. the HP restoring ability by magic of the player character 62C is set to 150% of the initial level) on the conditions that the formation based on the home positions 64B of the player characters 62A to 62D is a sixth formation and that all the player characters 62A to 62D are currently in their home positions. While the sixth formation is effective, when an instruction has been issued to the player character 62A to move to an area other than the home position 64B, the abilities changing unit 124 determines that a part of the formation has been broken, and sets the HP restoring ability of the player character 62C to 130% of the initial level. Further, when an instruction has been issued to the player character 62B to move to an area other than the home position 64B, the abilities changing unit 124 determines that the formation has been broken, and returns the HP restoring ability of the player character 62C to the initial level.

DESCRIPTION OF REFERENCE NUMERALS

10: mobile phone (game device)
50: game program
60: game area
62: player character
64: deployment area (second area)
64A: square (sub-area)
64B: home position
68: moving area (third area)
70: end area (first area)
72: enemy character
74: path; 102: operation unit
114: area setting unit
116: enemy character movement control unit
118: player character movement control unit
120: battle control unit
122: game termination unit
124: abilities changing unit.

What is claimed is:

1. A computer-implemented method comprising executing on a processor the steps of:

setting a game area, the game area comprising at least a first area in which a target movement position of an enemy character can be set, a second area including a number of sub-areas in which a home position of a player character can be set, and a third area in which a target movement position of the player character can be set;

setting an initial position of the enemy character in an area other than the first and second areas in the game area, and setting a target movement position of the enemy character in the first area, and controlling the enemy character to move from the initial position toward the target movement position that has been set;

setting the home position in one of the sub-areas for each of a number of player characters, and setting a target movement position of the player character in the third area in response to an operation input to the computer, and controlling the player character to move from the home position toward the target movement position that has been set;

controlling the player character and the enemy character to fight against each other in accordance with a positional relationship between the player character and the enemy character; and terminating a game in the case where a predetermined condition is met; wherein after one player character of the number of player characters has been moved to the set target movement position, the processor automatically moves the one player character to return the one player character from the current position back to the home position in which the one player character was originally located.

2. The computer implemented method according to claim 1, wherein the current position of the enemy character is set as the target movement position of the player character.

3. The computer implemented method according to claim 1, wherein the method comprises setting a plurality of paths for the enemy character to move thereon in the third area, the number of the paths being set to correspond to the number of the sub-areas.

4. The computer implemented method according to claim 3, further comprising controlling the player character to move across one path and another path among the plurality of paths.

5. The computer implemented method according to claim 3, wherein for each of a plurality of player characters, the method comprises setting a home position in one of the sub-areas, setting a target movement position of the player character in the third area in response to an operation input to the computer, and controlling the player character to move from the home position toward the set target movement position, and the method further comprising changing abilities of at least one of the player characters in accordance with a formation based on the home positions of the player characters.

6. The computer implemented method according to claim 5, wherein in the case of controlling the player character to move to the second area, the method comprises controlling the player character to move to the home position where the player character was located, and in the case where the home positions of the player characters fail to match the formation, the method comprises returning the changed abilities of the player character(s) to the abilities before the change.

7. The computer implemented method according to claim 5, wherein the method comprises changing the home position of the player character within the second area, in response to an operation input to the computer.

8. The computer implemented method according to claim 5, wherein the method comprises changing the abilities of the player character(s) on the conditions that the home positions of the player characters match the formation and that the current positions of all the player characters correspond to the home positions thereof.

9. A game device comprising:

a processor configured to accept an operation by a player;

set a game area, the game area comprising at least a first area in which a target movement position of an enemy character can be set, a second area including a number of sub-areas in which a home position of a player character can be set, and a third area in which a target movement position of the player character can be set;

set an initial position of the enemy character in an area other than the first and second areas in the game area, set a target movement position of the enemy character in the first area, and control the enemy character to move from the initial position toward the target movement position that has been set;

set the home position in one of the sub-areas for each of a number of player characters, set a target movement position of the player character in the third area in response to an operation input to the operation unit, and control the player character to move from the home position toward the target movement position that has been set;

control the player character and the enemy character to fight against each other in accordance with a positional relationship between the player character and the enemy character; and terminate a game in the case where a predetermined condition is met; wherein after one player character of the number of player characters has been moved to the set target movement position, the processor automatically moves the one player character to return the one player character from the current position back to the hope position in which the one player character was originally located.

* * * * *